April 24, 1928.
G. O. CRUIKSHANK
DEVICE FOR CURING TOBACCO AND THE LIKE
Filed May 13, 1927
1,667,512
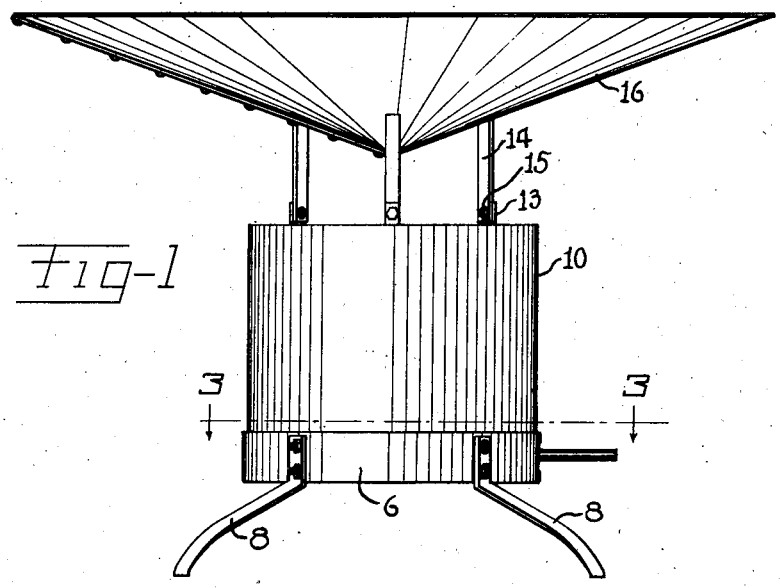
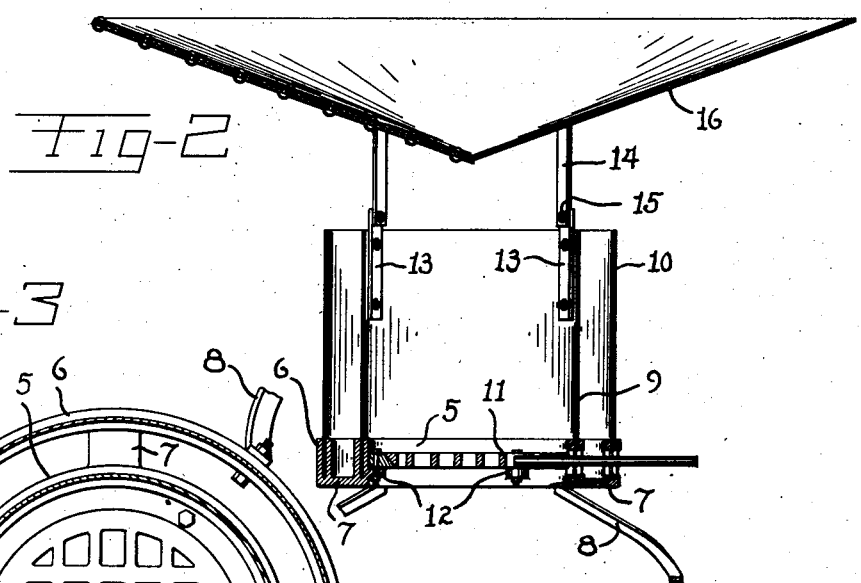
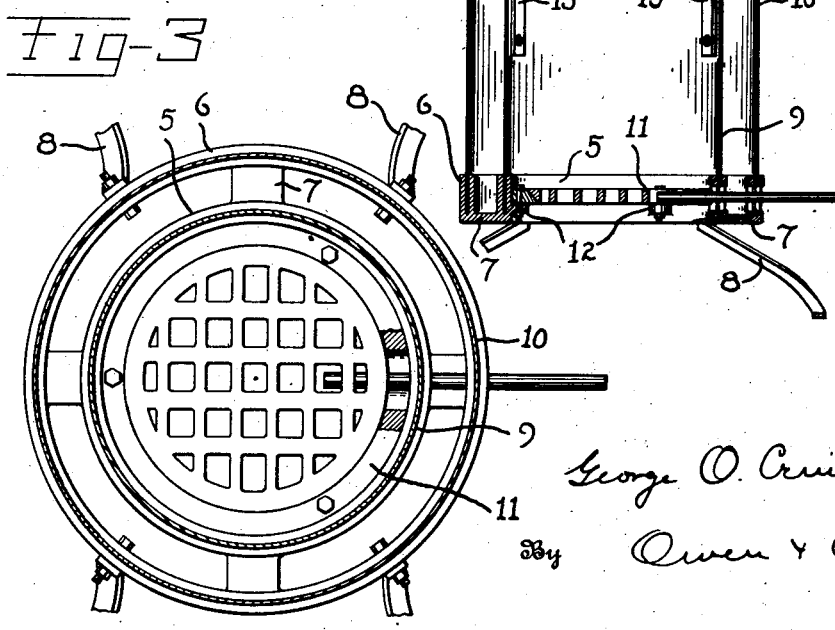
Inventor
George O. Cruikshank
By Owen & Owen
Attorneys Patented Apr. 24, 1928.

1,667,512

UNITED STATES PATENT OFFICE.

GEORGE O. CRUIKSHANK, OF LEIPSIC, OHIO.

DEVICE FOR CURING TOBACCO AND THE LIKE.

Application filed May 13, 1927. Serial No. 191,010.

This invention relates to a device for producing artificial heat, and is especially adapted for use in curing tobacco.

The primary object of the invention is to maintain a circulation of air throughout a tobacco barn by means of a simple and inexpensive device, so that all parts of the tobacco will be heated to a moderate and substantially uniform degree, and at the same time to supply sufficient moisture to prevent the tobacco from drying too rapidly. Such conditions are attained by the use of a fire pot in the form of an ordinary vertically disposed drum with a grate at the bottom thereof, and directly above the upper end of the drum and spaced therefrom is a deflector in the shape of an inverted cone. The fire pot is surrounded by an outer drum, spaced therefrom to provide an air jacket or flue, through which air circulates as it is warmed by contact with the wall of the fire pot, thus mingling with the hotter gases emitted from the burning fuel, to constitute a substantially homogeneous mixture of almost uniform temperature.

The specific construction and arrangement of the device, and the advantages resulting therefrom, will be more particularly explained with reference to the accompanying drawing, illustrating the preferred embodiment thereof.

In the drawing;

Figure 1 is a front elevation of the invention;

Fig. 2 is a vertical transverse section thereof, and

Fig. 3 is a horizontal section taken on the line 3—3 of Fig. 1.

As illustrated in the drawing, the device comprises a base, preferably made from cast iron, and including an inner circular bar 5 and an outer bar 6 concentric therewith and integrally connected thereto by spider arms 7. This base is supported at some distance above the ground or floor by means of supporting members 8, which are bolted or otherwise secured to the outer bar 6 and extend downwardly and outwardly therefrom, so as to provide a stable support to maintain the heater in proper position, and permit the same to be easily moved from place to place.

The bars 5 and 6 are each formed with upwardly extending flanges adapted to receive between them the lower ends of inner and outer drums 9 and 10 respectively. The inner drum 9 constitutes a fire pot and is provided at its lower end with a suitable grate 11 which may be mounted on lugs 12 extending inwardly from the bar 5. Three or more short uprights 13 are secured to the upper part of the drum 9 and extend a short distance above the drum and are provided with extensions 14 secured to their upper ends by bolts 15 or the like. A pan 16, in the shape of an inverted cone, rests upon the upper ends of these extensions.

The inner drum 9 may be made from any suitable material capable of withstanding the heat of the burning fuel. It has been found, however, that a heavy gage sheet iron will give very good service, since the current of air constantly passing upwardly within the outer drum or jacket 10 prevents the sides of the fire pot from becoming excessively heated. Coke may be used for fuel and cobs or other material may be mixed with the coke to impart the desired flavor to the tobacco.

The pan 16 is preferably made from a circular sheet metal blank. A V-shaped sector is cut from the blank and the edges left by the removal of this sector are drawn inwardly and lapped, and when held in this position they are brazed or welded to form a water tight receptacle.

In using this device, water is placed in the pan 16 and will be slowly evaporated by the heat from the burning fuel. The pan 16 serves not only as a receptacle for the water, but acts as a deflector to spread the heat equally in all directions. The outer drum 10 constitutes an air jacket and the air within this jacket, as it becomes heated through contact with the wall of the fire pot, flows upwardly and mingles with the hotter gases emitted from the fire. The pan 16 is constructed so that its conical surface forms an angle of substantially 20° with the horizontal plane of the base of the cone. It is important that the bottom surface of the pan should slope at substantially this angle in order that the air from within the jacket 10 and the hotter gases from the fire may become thoroughly intermingled to produce a mixture of substantially uniform temperature. Thus the tobacco throughout the barn will be moderately heated without any portions thereof becoming too hot and the evaporation of the water in the pan will prevent the tobacco from drying too quickly. The tobacco will, therefore, be cured so as to produce an article of superior quality.

While this invention is designed primarily for curing tobacco, it may be also used for heating a building. The pan 16 may be used in cooking vegetables. By loosening the bolts 15, the extensions 14 may be folded inwardly and the pan may be allowed to rest on the upper ends of the uprights 13, thereby imparting a greater amount of heat to the pan 16.

It will therefore be seen that the invention is capable of a great variety of uses. It will also be understood that the size, dimensions and details of construction, as well as the character of the material used in the manufacture of the device may be varied considerably without departing from the scope of the invention as defined in the appended claims.

What I claim is:

1. The combination with a fire pot having an opening at its upper end and provided with a grate at its lower end, of a deflector supported above and in spaced relation to the upper end of the fire pot, and a drum encircling the fire pot in spaced relation thereto and open at its upper and lower ends, to promote a vertical current of air adjacent the fire pot, which mingles with the hotter gases emitted from the fire pot, to constitute a substantially homogeneous mixture of nearly uniform temperature.

2. The combination with a fire pot open at its upper end and provided with a grate at its lower end, of a jacket encircling the fire pot in spaced relation thereto and forming an air chamber open at its upper and lower ends, to promote convectional currents of air adjacent the fire pot, and a deflector supported above and in spaced relation to the upper ends of the fire pot and jacket, said deflector extending some distance beyond the jacket, whereby the hot gases from the fire pot are spread and thoroughly intermingled with the more moderately heated air current from the air chamber.

3. The combination with a fire pot provided with a grate at its lower end and having an outlet at its upper end, of a deflector supported above and in spaced relation to the upper end of the fire pot, said deflector being constructed to form a receptacle for water and having a bottom surface in the shape of an inverted cone with its axis substantially in vertical alinement with the center of the fire pot, and a drum encircling the fire pot in spaced relation thereto and forming an air chamber open at its upper and lower ends, so that a current of air will pass upwardly therethrough and mingle intimately with the hotter gases emitted from the fire pot.

4. The combination with a fire pot provided with a grate at its lower end and having an outlet at its upper end, of a jacket encircling the fire pot and defining an annular air chamber open at its upper and lower ends, and a deflector supported above and in spaced relation to the upper ends of the fire pot and jacket, said deflector being in the shape of an inverted cone and constituting a receptacle for containing water, said deflector extending outwardly some distance beyond the jacket.

5. In a device of the class described, the combination of a base comprising inner and outer circular concentric bars with struts connecting them and holding them in fixed relation to each other, means for supporting said base in spaced relation to the ground, each bar being formed with spaced upwardly extending side flanges, a fire pot resting between the flanges of the inner bar, a deflector supported above and in spaced relation to the upper end of the fire pot, and an outer drum resting between the flanges of the outer bar and defining an annular chamber encircling the fire pot and open at its upper and lower ends, so as to promote a vertical upward current of air which mingles with the hotter gases emitted from the fire pot.

6. In a device of the class described, the combination of a base comprising inner and outer circular concentric bars with struts connecting them and holding them in fixed relation to each other, means for supporting the base in spaced relation to the ground, each bar being formed with spaced upwardly extending flanges, a fire pot with its lower end held between the flanges of the inner bar and open at its upper end, a grate at the bottom of said fire pot, a jacket supported with its lower end between the flanges of the outer bar, said jacket defining an annular chamber encircling the fire pot and open at its upper and lower ends to promote convectional currents of air adjacent the fire pot, and a deflector supported above and in spaced relation to the upper ends of the fire pot and jacket, said deflector extending some distance outwardly beyond the jacket, whereby the hot gases from the fire pot are spread and thoroughly intermingled with the more moderately heated air current from the interior of the jacket.

7. In a device of the class described, the combination of a base comprising inner and outer circular concentric bars with struts connecting them and holding them in fixed relation to each other, means for supporting the base at a distance above the ground, each bar being formed with spaced upwardly extending flanges, a fire pot with its lower end held between the flanges of the inner bar and open at its upper end, a grate at the bottom of said fire pot, a jacket supported with its lower end between the flanges of the outer bar, said jacket defining an annular chamber encircling the fire pot and open at its upper and lower ends to promote convectional currents of air adjacent the fire pot, and a deflector supported above and in spaced relation to the upper ends of the fire pot and jacket, said deflector being in the shape of an inverted cone and constructed to form a receptacle for containing water.

8. In a device of the class described, the combination of a base comprising inner and outer circular concentric bars with struts connecting them and holding them in fixed relation to each other, means for supporting said base in spaced relation to the ground, each bar being formed with spaced upwardly extending flanges, a fire pot with its lower end held between the flanges of the inner bar and open at its upper end, a grate at the bottom of said fire pot, a jacket supported with its lower end between the flanges of the outer bar, said jacket defining an annular chamber encircling the fire pot and open at its upper and lower ends to promote convectional currents of air adjacent the fire pot, and a deflector supported above and in spaced relation to the upper ends of the fire pot and jacket, said deflector being in the shape of an inverted cone and constructed to form a receptacle for containing water, the slope of the conical surface from the apex of the cone to the outer edge of the deflector being at an angle of substantially 20° from a horizontal plane, said outer edge being some distance outside of the jacket.

9. In a device of the character described, the combination of an inner drum constituting a fire pot, an outer drum encircling the inner drum and spaced therefrom to define an air chamber open at its top and bottom, uprights projecting upwardly from one of said drums, a deflector supported by said uprights and constructed to form a receptacle for water, and means for adjusting said uprights to vary the distance between said deflector and the upper ends of said drums.

10. In a device of the character described, the combination of an inner drum constituting a fire pot, an outer drum encircling the inner drum and spaced therefrom to define an air chamber open at its top and bottom, uprights projecting upwardly from one of said drums, a deflector supported by said uprights and presenting a conical bottom surface which slopes outwardly and upwardly from a central point above the drums, said deflector also constituting a receptacle for liquid, and means for adjusting said uprights to vary the distance between said deflector and the upper ends of said drums.

In testimony whereof I have hereunto signed my name to this specification.

GEORGE O. CRUIKSHANK.